United States Patent
Kozica

(10) Patent No.: US 8,542,609 B2
(45) Date of Patent: Sep. 24, 2013

(54) MULTICAST RATE OPTIMIZATION

(75) Inventor: Ermin Kozica, Nacka (SE)

(73) Assignee: Google Inc., Mountain View, CA (US)

( * ) Notice: Subject to any disclaimer, the term of this patent is extended or adjusted under 35 U.S.C. 154(b) by 179 days.

(21) Appl. No.: 13/059,825

(22) PCT Filed: Aug. 20, 2009

(86) PCT No.: PCT/EP2009/060808
§ 371 (c)(1),
(2), (4) Date: Feb. 18, 2011

(87) PCT Pub. No.: WO2010/020680
PCT Pub. Date: Feb. 25, 2010

(65) Prior Publication Data
US 2011/0149833 A1   Jun. 23, 2011

Related U.S. Application Data

(60) Provisional application No. 61/090,811, filed on Aug. 21, 2008.

(30) Foreign Application Priority Data

Aug. 20, 2008  (EP) .................................. 08162702

(51) Int. Cl.
*H04L 12/26* (2006.01)
(52) U.S. Cl.
USPC ............................ 370/252; 370/318; 370/465
(58) Field of Classification Search
USPC ................. 370/252–253, 318–327, 465–473, 370/485–497, 516–545; 375/240, 325
See application file for complete search history.

(56) References Cited

FOREIGN PATENT DOCUMENTS

| EP | 1 675 324 A1 | 6/2006 |
| EP | 1675324 A1 * | 6/2006 |
| WO | WO 2007/131527 A1 | 11/2007 |
| WO | WO2007131527 A1 * | 11/2007 |

OTHER PUBLICATIONS

IEEE/ACM Transactions on Networking, vol. 13, No. 3, Jun. 2005, Hamid Jafarkhani et al.*
Li B. et al., "An End-to-End Adaptation Protocol for Layered Video Multicast Using Optimal Rate Allocation", IEEE Transactions on MultiMedia, vol. 6, No. 1, Feb. 1, 2004, pp. 87-102.
Liqiao Han et al., "Cross Layer Optimization for Scalable Video Multicast over 802.11 WLANs", IEEE Consumer Communications and Networking Conference, vol. 2, Jan. 8, 2006, pp. 838-843.
International Preliminary Report on Patentability for corresponding application PCT/EP2009/060808, dated Mar. 3, 2011.
Yousefi'zadeh, H., Layered Media Multicast Control (LMMC): Rate Allocation and Partitioning, IEEE, XP-002517229, Jun. 2005.

* cited by examiner

*Primary Examiner* — Ricky Ngo
*Assistant Examiner* — Iqbal Zaidi
(74) *Attorney, Agent, or Firm* — Birch, Stewart, Kolasch & Birch, LLP

(57) ABSTRACT

This invention relates to multicast rate optimization, particularly a method for controlling an encoder (1) in a communications system (3) including a plurality of receivers (2). The method includes partitioning the receivers (2) into at least one cell, and associating each cell with a specific rate that may be used to transmit signals to a receiver (2). According to the inventive method, uncertainties in estimates of conditions of the communications system (3) are taken into account by modelling the conditions, such as the average distortion perceived by the receivers (2), as the outcome of a stochastic variable, thereby accounting for uncertainties in the estimates of the conditions of the communications system (3). The invention also relates to an encoder associated with the method.

20 Claims, 4 Drawing Sheets

MULTICAST RATE OPTIMIZATION

This application is the National Phase of PCT/EP2009/060808 filed on Aug. 20, 2009, which claims priority under 35 U.S.C. 119(e) to U.S. Provisional Application No. 61/090,811 filed on Aug. 21, 2008 and under 35 U.S.C. 119(a) to Patent Application No. 08162702.8 filed in Europe on Aug. 20, 2008, all of which are hereby expressly incorporated by reference into the present application.

FIELD OF THE INVENTION

The present invention relates to a method and a device for multicast rate optimization. In particular, the present invention relates to a method for controlling an encoder in a communications system and an associated device.

BACKGROUND OF THE INVENTION

Multicast is a bandwidth efficient technique for transmission of a source signal from a transmitter to a plurality of receivers in a communications system. In general, an encoder is included in a transmitter, and a decoder is included in a receiver. As well known, the purpose of encoding a signal is to achieve a compact representation of the signal. In general, such encoding is carried out according to one or more of two basic coding principles, namely redundancy removal, that is exploiting signal properties that are predictable, e.g., the correlation between pixels in an image (spatial redundancy), the correlation between pixels in adjacent video signal frames (temporal redundancy), etc., and irrelevancy removal, that is exploiting the indifference of a receiver to certain variations in the signal representation, e.g., the indifference of a viewer to small quantization errors in a video signal.

The efficiency of multicast is mainly due to the fact that the encoding of the source signal needs to be transmitted only once over any link in the communications system. However, the bandwidth efficiency comes with the disadvantage that all receivers in the communications system are constrained to use the same encoding of the source signal. Thus, every receiver perceives the same signal quality, which is determined by the bit-rate of the encoding, regardless of their respective capacity to receive signals. In general, each receiver may have a different capacity to receive signals compared to the other receivers in the communications system.

In general, coding systems need to take into account the reliability of the communications system in which they operate. In a communications system, there is generally a certain probability of non-ideal transmission of signals, for example distorting the encoded signal or transmitting only parts of the encoded signal. Furthermore, demands on the coding systems may change rapidly due to variations in the load on the communications system, inaccurate estimations of the capacity of receivers to receive signals, receivers joining and leaving the transmission session, etc.

Advantageously, an encoder should therefore be able to quickly adapt to changes in the estimated conditions of the communications system and account for uncertainty of the estimated conditions. Conventional methods for choosing the bit-rate of the encoding are based on iterative procedures having high computational complexity, see, e.g., Y. R. Yang, M. S. Kim, and S. S. Lam, "Optimal partitioning of multicast receivers", Int. Conf. on Network Protocols, pp. 129-140, November 2000, H. Yousefi'zadeh, H. Jafarkhani, and A. Habibi, "Layered media multicast control (LMMC): Rate allocation and partitioning", IEEE/ACM transactions on Networking, vol. 13, pp. 540-553, 2005, and J. Liu, B. Li, and Y.-Q. Zhang, "Optimal stream replication for video multicasting", IEEE Transactions on Multimedia, vol. 8, pp. 162-169, 2006. Such conventional methods are particularly inefficient when the number of decodable subsets of the streams is large.

Thus, there is a need within the art for a multicast bit-rate optimization method such that the performance of the overall encoding and decoding system in a communications system is improved, which method efficiently allows for a large number of decodable subsets of streams, as well as providing an improved adaptivity to varying conditions in the communications system and taking into account the uncertainty that is inherent in estimations of such conditions.

SUMMARY OF THE INVENTION

As already mentioned above, a key aspect of the multicast bit-rate optimization problem is the time variance of the communications system, e.g., the load on the communications system, inaccurate estimations of the capacity of receivers to receive signals, receivers joining and leaving the transmission session, etc.

Thus, it is an object of the present invention to provide a method for controlling an encoder in a communications system including a plurality of receivers such that the performance of the overall encoding and decoding system in the communications system is improved.

It is a further object of the present invention to provide an apparatus for performing such a method.

According to a first aspect of the present invention, there is provided a method for controlling an encoder in a communications system as defined in the independent claim 1.

In the context of the present invention, the properties of the decodable subsets of the streams preferably consists of, but are not limited to, transmission quality measures that have an impact on the overall encoder-decoder system performance.

By the method according to the first aspect of the invention, uncertainties in estimates of conditions of the communications system are taken into account by modelling the conditions, in particular the average distortion perceived by the receivers, as the outcome of a stochastic variable, where the stochastic nature of the model accounts for uncertainties in the estimates of the conditions. Also, because the output of the method according to the first aspect of the invention depends on the estimates of the conditions, the method is adaptive to varying conditions in the communications system.

According to a second aspect of the present invention, there is provided an encoder for use in a communications system including a plurality of receivers as defined in the independent claim 8.

The encoder according to the second aspect of the invention is adapted to perform the method according to the first aspect of the invention, and thus the same advantages as for the first aspect of the invention apply to the second aspect of the invention.

According to an embodiment of the present invention, it is preferred to choose one or more cells of the subset of cells, and for each of the one or more chosen cells determining if the condition (i) that the contribution to the average distortion perceived by the receivers contained in the cell and the bordering cells of said cell is minimal under the conditions that the properties of the decodable subsets of said cell and the bordering cells of said cell can be altered, and that the total size of said cell and the bordering cells of said cell cannot be altered, is satisfied for the cell, and, if that is not the case, assigning a new value for the rate of the decodable subsets of the streams that is associated with the cell, such that the condition (i) above is satisfied for the cell. This ensures that the average distortion perceived by the receivers, contained in the one or more cells and the bordering cells of said one or more cells, is minimal.

According to a further embodiment of the present invention, the properties of the decodable subsets of the streams consists of one or more of the following: the signal representation length per time unit, the error resilience, and the erasure resilience. These properties directly influence the perceived distortion by the receivers, and thus it is advantageous to be able to vary these properties during the process of controlling the encoder.

According to yet another embodiment of the present invention, feedback information for the plurality of receivers is received, wherein the feedback information includes a measure of a constraint on the rate that may be used to transmit signals to a receiver, wherein the constraint consists of the available bandwidth for communicating with the receiver.

According to yet another embodiment of the present invention, the plurality of streams includes video or audio signals.

According to yet another embodiment of the present invention, the encoder includes a plurality of sub-encoders, each sub-encoder outputting one stream, wherein each sub-encoder is provided with a property of the stream that is outputted by the sub-encoder. Thus, individual control of each sub-encoder is possible, thereby facilitating operation of the sub-encoder especially suited to the capacity of the sub-encoder.

According to yet another embodiment of the present invention, the encoder includes a layered (embedded) or multiple-description encoder outputting a plurality of streams, which form a number of decodable subsets, wherein the layered or multiple-description encoder is provided with a property for each decodable subset that is outputted by said layered or multiple-description encoder. This provides, by an alternative configuration, similar advantages to those for the embodiment of the invention described immediately above.

According to yet another embodiment of the present invention, each stream of the plurality of streams is transmitted to one or more predetermined receivers. In this manner, the communications system may be regarded as a relay network for facilitating transfer of signals between transmitters (encoders) and receivers. The total number of streams that a receiver may receive is equal to the number of decodable subsets of the streams.

According to yet another embodiment of the present invention, it is preferred to assign initial values for the rates of the decodable subsets of the streams.

It is to be understood that it is within the scope of the invention that the features described above with reference to the different aspects and embodiments of the present invention, as well as the features disclosed in the appended claims, can be combined in an arbitrary manner. For example, according to one exemplary embodiment of the present invention, the method according to the first aspect of the invention further includes receiving feedback information for the plurality of receivers, wherein the feedback information includes a measure of the rate that may be used to transmit signals to a receiver, and furthermore, choosing one or more cells of the at least one cell, and for each of the at least one or more chosen cells determine if the condition (i) above is satisfied for the cell, and, if that is not the case, assign a new value for the rate of the decodable subsets of the streams that is associated with the cell, such that the condition (i) above is satisfied for the cell.

BRIEF DESCRIPTION OF THE DRAWINGS

It should be understood that the exemplary embodiments of the present invention as shown in the figures are for purpose of exemplification only. Further embodiments and advantages of the present invention will be made apparent when the figures are considered in conjunction with the following detailed description and the appended claims.

Furthermore, it is to be understood that the reference signs provided in the drawings are for the purpose of facilitating quicker understanding of the claims, and thus, they should not be construed as limiting the scope of the invention in any way.

DETAILED DESCRIPTION OF PREFERRED EMBODIMENTS

Preferred embodiments of the present invention will now be described for the purpose of exemplification with reference to the accompanying drawings, wherein like numerals indicate the same elements throughout the views. It should be understood that the present invention encompasses other exemplary embodiments that comprise combinations of features described in the following. Additionally, other exemplary embodiments of the present invention are defined in the appended claims.

Figure 1:
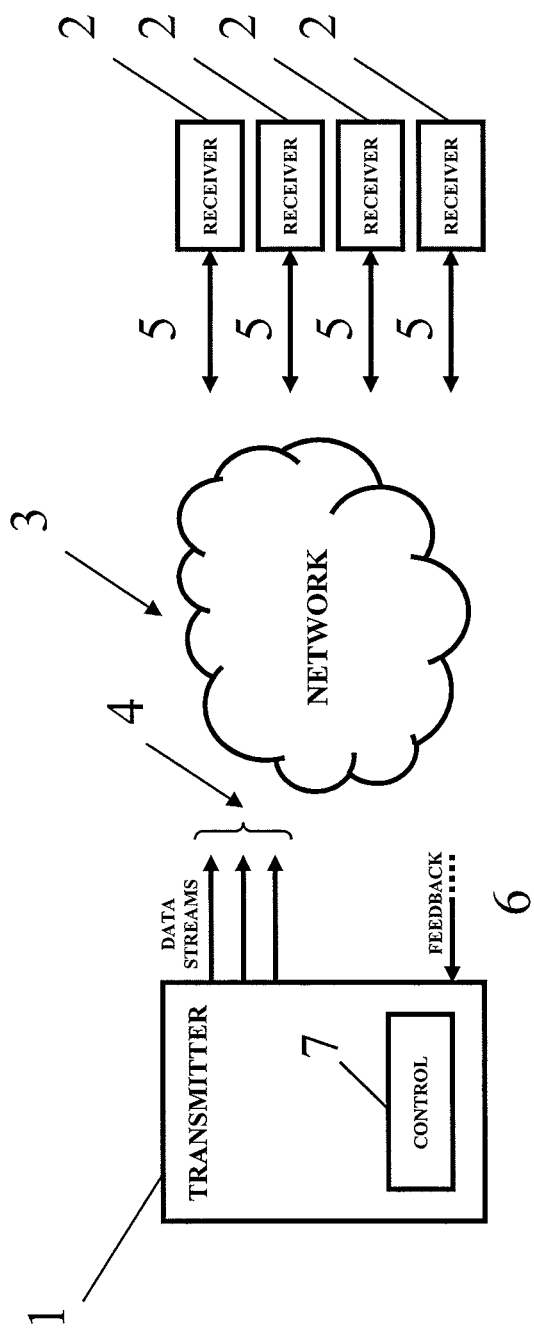
FIG. 1 is a flowchart illustrating an embodiment of the present invention.

FIG. 1 is a schematic illustration of an exemplary embodiment of the present invention. In FIG. 1, a transmitter is denoted by the numeral 1. However, in the exemplary embodiment shown in FIG. 1, the transmitter includes an encoder. Thus, in the following, for the purpose of explaining the invention, the term transmitter and the term encoder are interchangeably used. However, this should not be construed as limiting the present invention in any way.

The encoder 1 receives as input one or more signals (not shown) to be transmitted to receivers 2 via a communications system 3. According to exemplary embodiments of the present invention, said input signals are produced by a video camera or the like or a microphone or the like, or by a combination of such devices. According to further exemplary embodiments of the present invention, the communications system may be a wireless network, such as the GSM network, a packet network, such as the Internet, or transmission mediums such as storage devices, e.g., compact discs, hard-disc drives, etc., or any other communications system apparent for a person skilled in the art. In the exemplary embodiment of the present invention illustrated in FIG. 1, the number of receivers 2 is four. However, it is the purpose that the invention encompasses other exemplary embodiments of the present invention including any number of receivers.

As well known in the art, in the encoder 1, the input signal to be transmitted to the receiver 2 is encoded in order to achieve a more compact representation of the signal, thereby facilitating communication between the transmitter (encoder) 1 and a receiver 2. Furthermore, as also well known in the art, a receiver in an encoding-decoding system generally includes a decoder. Naturally, the purpose of the decoder is to decode an encoded signal transmitted from a transmitter (encoder).

The output of the encoder 1 consists of a plurality of streams 4, the streams being of the kind that at least some subsets of the streams can be decoded without knowledge of every stream of the plurality of streams 4. Herein, such subsets of the streams are referred to as decodable subsets. In the exemplary embodiment of the present invention illustrated in FIG. 1, the number of streams 4 is three. However, it is the purpose that the invention encompasses other exemplary embodiments of the present invention including any number of streams. According to exemplary embodiments of the invention, the streams 4 include video or audio signals.

Each of the receivers 2 receives at least one decodable subset of the streams and preferably transmits feedback information to the encoder 1. This is represented by the multiple arrow points on the item designated 5 in FIG. 1.

Thus, according to an exemplary embodiment of the present invention, the encoder 1 receives as input, apart from the one or more signals mentioned above, feedback information 6 for the receivers 2 via the communications system 3. Preferably, the feedback information 6 is such that it includes a measure of the constraint on the rate that may be used to transmit signals to a receiver 2. According to another embodiment of the present invention, the constraint on the rate that may be used to transmit signals to a receiver consists of the available bandwidth for communicating with the receiver. Preferably, the encoder 1 includes a control unit 7 that is adapted to receive said feedback information 6.

Figure 2:
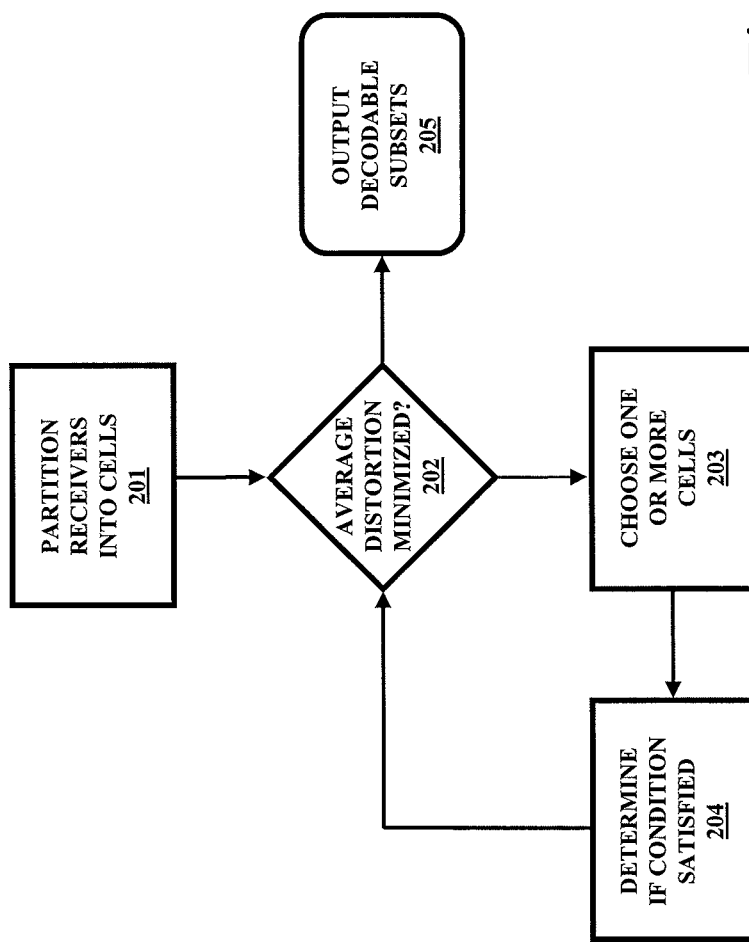
FIG. 2 is a schematic illustration of an embodiment of the present invention.

FIG. 2 is a flowchart illustrating an exemplary embodiment of the present invention. In step 201, the plurality of receivers 2 contained in the communications system 3 are partitioned into at least one cell, where each cell is associated with a decodable subset of the streams. Furthermore, each of the decodable subsets is associated with a specific rate that may be used to transmit signals to a receiver. In exemplary embodiments of the present invention, there is assigned initial values for the rates of the decodable subsets of the streams. The assignment of initial values can be performed prior to step 201, or after step 201 but before step 202.

Next, for a subset of the at least one cell, there is determined in step 202 if (i) the contribution to the average distortion perceived by the receivers contained in the subset of cells and the bordering cells of said subset of cells is minimal under the conditions that the properties of the decodable subsets of said subset of cells and the bordering cells of said subset of cells can be altered, and that the total size of said subset of cells and the bordering cells of said subset of cells cannot be altered. If such is the case, the encoder is controlled in step 205 by outputting the decodable subsets of the streams in accordance with the rates of the decodable subsets of the streams that are obtained when steps 201 and 202 are performed.

In other words, if the rates that in step 201 were associated with the decodable subsets of the streams satisfies the condition (i), the so determined rates are used for controlling the encoder by outputting the decodable subsets of the streams in accordance with the so determined rates.

However, if such is not the case, one or more cells of the subset of cells is chosen in step 203, and for each of the one or more chosen cells, there is determined in step 204 if the condition (i) is satisfied for the cell. If the condition (i) is satisfied for said one or more chosen cells, step 202 is performed again. If not, there is assigned a new value for the rate of the decodable subset of the streams that is associated with a respective cell such that the condition (i) is satisfied for the cell, before step 202 is performed again.

According to exemplary embodiments of the present invention, the one or more cells chosen in step 203 are chosen randomly, according to a predefined order, or are chosen so that for each of the one or more cells chosen, the average distortion perceived by the receivers contained in the cells bordering the cell is decreased the most compared to choosing any other cell.

The perceived distortion of the signals received by the receivers 2 is directly dependent on the rates of the decodable subsets of the streams, with the rates obtained as illustrated in FIG. 2. On the basis of the rates of the decodable subsets of the streams, control signals 8 are sent from the control unit 7 to the encoder 1 for controlling the encoder 1. Therefore, the output from the control unit 7 has a significant impact on the overall performance of the total encoding-decoding system.

According to an exemplary embodiment of the present invention, the properties of the decodable subsets of the streams consist of one or more of the signal representation length per time unit, that is, the rate, the error resilience, and the erasure resilience.

Figure 4:
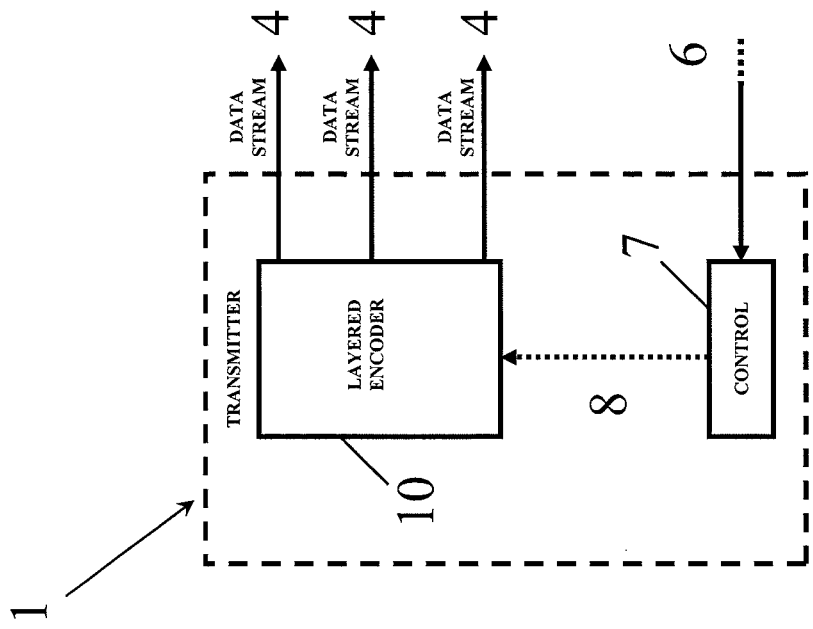
FIG. 4 is a schematic illustration of yet another embodiment of the present invention.
Figure 3:
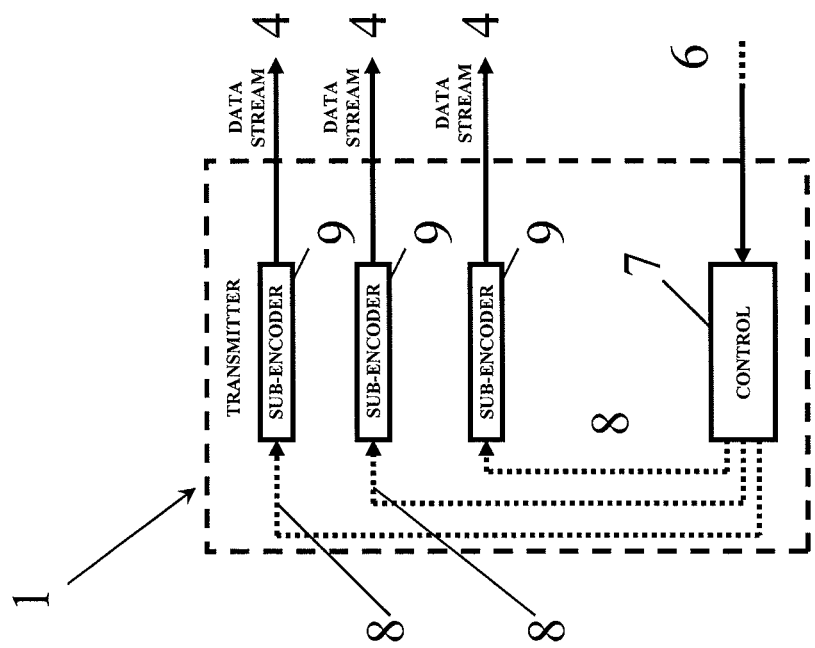
FIG. 3 is a schematic illustration of another embodiment of the present invention.

As illustrated in FIGS. 3 and 4, the control unit 7 provides control signals 8 to the encoder 1, the control signals 8 generally being such that based on the control signals 8, the encoder 1 can set appropriate values of the rates of the decodable subsets of the streams based on current conditions in the communications system 3, as described above with reference to FIG. 2.

According to an exemplary embodiment of the present invention, the encoder 1 includes a plurality of sub-encoders 9, as illustrated in FIG. 3, where each sub-encoder 9 outputs a single stream 4. According to said embodiment of the present invention, the control unit 7 is adapted such that each sub-encoder 9 is provided with an estimate of a rate of the stream 4 that is outputted by said sub-encoder 9. Thus, according to said embodiment of the present invention, the control unit 7 can individually control each sub-encoder 9, thereby facilitating operation of the sub-encoder 9 especially suited to the capacity of the sub-encoder 9.

An alternative embodiment of the present invention is illustrated in FIG. 4, wherein the encoder 1 includes a layered or multiple-description encoder 10 outputting a number of streams 4 forming a number of decodable subsets, wherein the layered or multiple-description encoder is provided with a property for each decodable subset that is outputted by said layered or multiple-description encoder. This provides, among other things, the same advantage, by an alternative configuration of the encoder 1, as for the exemplary embodiment described immediately above in conjunction with FIG. 3.

According to other embodiments of the present invention, each stream 4 of the plurality of streams 4 outputted from the encoder 1 is transmitted to one or more predetermined receivers 2. In this way, the communications system 3 may be regarded as a relay network for facilitating transfer of signals between transmitters (encoders) 1 and receivers 2. The total number of streams 4 that a receiver 2 may receive is equal to the number of decodable subsets of the streams 4.

According to an alternative, advantageous, exemplary embodiment of the invention, there is provided a method for controlling an encoder in a communications system including a plurality of receivers, wherein the encoder output consists of a plurality of streams of the kind that at least some subsets of the streams can be decoded without knowledge of every stream of the plurality of streams, said method including the steps of receiving feedback information from the communication system for each of the plurality of receivers, the feedback information including a measure of a constraint on the rate, preferably consisting of the available bandwidth for communicating with the receiver, that may be used to transmit signals to the receiver, modelling the measure by a continuous stochastic variable while minimizing the distortion perceived by the receiver, from which modelling estimates of transmission quality measures of the decodable subsets of the streams are obtained and controlling the encoder to output the decodable subsets of the streams in accordance with the thus obtained transmission quality measures of the decodable subsets of the streams. Preferably, a control unit included in an encoder is adapted to perform the steps of said method. In the following, the inventive theory underlying the present invention is described.

Let the receivers in the communications system be numbered by the index $j \in \{1, \ldots, J\}$, where the total number of receivers are J. A property (condition) of a communications system for a receiver j is given by a constraint $c_j$ on the rate that may be used to transmit signals to the receiver. The constraint $c_j$ may be construed as the available bandwidth for communication with receiver j. It is assumed that the conditions of all receivers are realizations of a stochastic variable having a probability density function $f(c)$. This probability density function characterizes the statistics of the conditions of the receivers.

Let the distortion perceived by a receiver, receiving a decodable subset at the rate r, be d(r). In principle, an arbitrary number of functions may be used to characterize the distortion d(r), two examples of which are:

$$d(r) = a2^{-br}, \quad (1)$$

and $$d(r) = \frac{\theta}{r - R_0} + D_0. \quad (2)$$

The parameters a, b, $\theta$, $R_0$ and $D_0$ in equations (1) and (2) are model parameters chosen such that d(r) corresponds to the distortion perceived by the receiver. These parameters can, for example, be chosen in an off-line search for the parameters that, via the model d(r), best represent the perceived distortion. Further, these parameters may change over time in order to better suit the signals, e.g., video signals, that are being transmitted at any given instance.

The receivers may be partitioned into I disjoint sets, or cells, $V_i$, where $i \in \{1, \ldots, I\}$. Each cell $V_i$ is associated with a reconstruction point $r_i$ that is an approximation of the conditions (e.g., the rate constraint) of all the receivers belonging to the cell $V_i$ for which one decodable subset of the streams is optimized. Let $r=\{r_i\}_{i=1}^I$ denote the set of all I reconstruction points, where each reconstruction point $r_i$ corresponds to one decodable subset.

The partitioning of the receivers into cells $V_i$ is determined by the communications system (possibly controlled by receiver preferences), which by relaying specific subsets of the streams to each receiver acts as a quantizer, characterized by an assignment function $a(r,c_j)$. The output of the assignment function is the reconstruction point $r_i$, to which a receiver is associated. The cell $V_i$ is defined as $$V_i = \{c : a(r,c) = r_i\}, \quad (3)$$

where the assignment function is defined by $$r_i = a(r,c) = \{r_i : r_i \leq c \leq r_{i+1}, r_i \in r\}. \quad (4)$$

The assignment function ensures that each receiver obtains the stream having the highest rate available, while not exceeding the constraint of the receiver.

The average distortion D perceived by the receivers is $$D = \sum_{i=1}^{I} \int_{r_i}^{r_{i+1}} d(a(r_i, c)) f(c) dc \quad (5)$$

$$= \sum_{i=1}^{I} \int_{r_i}^{r_{i+1}} d(r_i) f(c) dc$$

where $r_0 = 0$ and $r_{I+1} \to \infty$.

Now, let the cell width be defined by $\Delta_i = r_{i+1} - r_i$. For small cell widths, or equivalently, a large number of cells, it is reasonable to assume that the probability density function $f(c)$ is constant within a cell, and that the distortion function d(c) varies linearly within a cell. In quantization theory, this assumption is commonly referred to as the high-rate assumption. Under these assumptions, the distortion within the cell $V_i$ is $$\int_{r_i}^{r_{i+1}} d(r_i) f(c) dc = \int_{r_i}^{r_{i+1}} d\left(c - \frac{1}{2}\Delta_i\right) f(c) dc. \quad (6)$$

The variations of the cell width with respect to c can be approximated by a function $\Delta(c)$ such that $$\Delta(r_i) = \Delta_i. \quad (7)$$

The inverse of $\Delta(c)$ represents the density of reconstruction points:

$$g(c) = 1/\Delta(c). \quad (8)$$

By integrating the density of reconstruction points, the total number of reconstruction points is obtained:

$$\int_0^\infty g(c) dc = I. \quad (9)$$

Now, from equations (6), (7), and (8), the average distortion according to equation (5) is:

$$D = \sum_{i=1}^{I} \int_{r_i}^{r_{i+1}} d\left(c - \frac{1}{2} g^{-1}(c)\right) f(c) dc. \quad (10)$$

In order to find the minimum distortion D, the density of reconstruction points g(c) is optimized by some optimization method, for example by applying the method of Lagrange multipliers. The Lagrangian to be minimized is $$\Lambda = \int_0^\infty \left( d\left(c - \frac{1}{2} g^{-1}(c)\right) f(c) + \lambda g(c) \right) dc, \quad (11)$$

where $\lambda$ is a Lagrange multiplier. The optimum density of reconstruction points can be found by differentiating the above Lagrangian with respect to g(c), setting the thus obtained derivative equal to zero, and solving for g(c). Of course, other optimization techniques may be used.

According to one example, the distortion function d(r) is given by equation (1). By replacing d(r) in equation (11) with equation (1), the optimal density of reconstruction points can be shown to be $$g(c) = \frac{b}{4}\ln(2)\frac{1}{W\left(\sqrt{\frac{-\lambda 2^c \ln(2)}{8af(c)}}\right)}, \quad (12)$$

where $W(\cdot)$ is the Lambert W function, defined according to:

$$X = W(X)\exp(W(X)). \quad (13)$$

According to another example, the distortion function $d(r)$ is given by equation (2). By replacing $d(r)$ in equation (11) with equation (2), the optimal density of reconstruction points can be shown to be:

$$g(c) = \frac{\frac{1}{2} + \sqrt{\theta f(c)/2\lambda}}{c - R_0}. \quad (14)$$

In order to obtain the set of reconstruction points r from the density of reconstruction points $g(c)$, a companding approach can be used. First, a compressor $h(c)$ is defined as a monotonically increasing function $$\gamma = h(c) \quad (15)$$

that maps c to $\gamma$ in the interval [0,1]. The compressor $h(c)$ is such that the optimal quantization cells in the $\gamma$ domain all have equal width. By using the relation between a random variable and its transform by a monotonic function, the density of reconstruction point density can be expressed as $$g(c) = g_\Gamma(h(c))\left|\frac{\partial h(c)}{\partial c}\right| \quad (16)$$

$$= I\left|\frac{\partial h(c)}{\partial c}\right|,$$

where it has been used that $g_\Gamma(\gamma) = I$. Then, reevaluating the Lagrangian [equation (11)] for $$g(c) = I\left|\frac{\partial h(c)}{\partial c}\right|$$

and solving for $$\left|\frac{\partial h(c)}{\partial c}\right|,$$

the following relation between the density of reconstruction points $g(c)$ and the compressor $h(c)$ can be found:

$$h(c) = \frac{1}{I}\int_{-\infty}^{c} g(c)dc. \quad (17)$$

The optimal quantization cells are found by expanding the optimal quantization cells in the companded domain with the inverse of equation (17). The optimal reconstruction points are the reconstruction points for which the distortion within the cells is minimized and the quantization cell widths are not altered. For cells $\{V_i : i = 2, \ldots, I\}$, the reconstruction points are set as the lower boundary, because choosing any other point would result in non-optimal quantization cell boundaries according to the assignment function in equation (4). This is not the case for the first cell. Namely, choosing any reconstruction point within the cell effectively divides the cell into two subcells. The first subcell has the reconstruction point at rate zero, $r_0 = 0$, and all receivers assigned to $r_0$ are excluded from the multicast. The second subcell has the reconstruction point $r_1$ as its lower boundary. $r_1$ is set to the value that minimizes the expected distortion within the first cell, that is $$r_1 = \underset{r_1}{\operatorname{argmin}} \int_0^{r_1} d(0)f(c)dc + \int_{r_1}^{r_2} d(r_1)f(c)dc. \quad (18)$$

The rate of the decodable subsets of the streams, that is the controller output, is given by the so obtained reconstruction points that minimizes the expected distortion.

Next, an alternative approach to determining the reconstruction points $r_i$ using an iterative process is described.

The average distortion D can be divided into contributions $d_i$ to the distortion from each cell:

$$D = \sum_{i=1}^{I} \int_{V_i} d(r_i, \theta)f(\theta)d\theta = \sum_{i=1}^{I} d_i. \quad (19)$$

A change in any element $r_{i'}$ of the set of reconstruction points r affects the distortion of receivers in the cells that borders the cell $V_{i'}$. Let the set S contain the cells that borders the cell $V_{i'}$. Then, if $r_{i'}$ is such that the distortion contributions of the cells in S is minimal, according to $$r_{i'} = \underset{r_{i'}}{\operatorname{argmin}} \sum_{i \in S} \int_{V_i} d(r_i)f(c)dc, \quad (20)$$

$r_{i'}$ is so called locally optimal.

Figure 5:
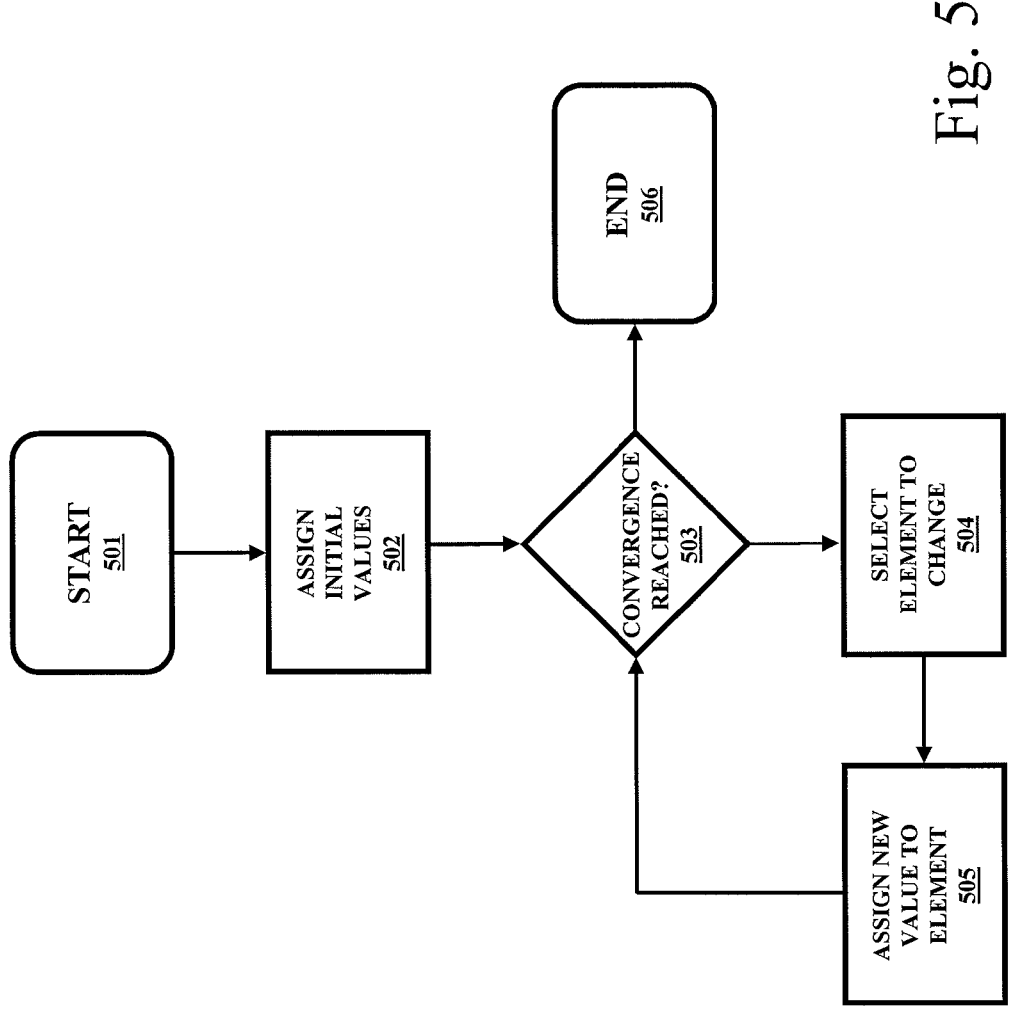
FIG. 5 is a flowchart for explaining the inventive theory underlying the present invention.

The iterative process is illustrated in FIG. 5, wherein the process starts in step 501.

In step 502, the elements of the set of reconstruction points r are assigned their initial values. The initial input, for instance values of the elements of r, can be chosen randomly or according to a predefined input.

In step 503, there is performed a convergence check by checking whether each element of r is locally optimal according to equation (20). If convergence is deemed to have been reached, the process ends (step 506). If convergence is deemed not to have been reached, step 504 is performed.

In step 504, at least one element of r is chosen to be changed. According to one example, the element of r that is to be changed is chosen to be the element that gives the largest decrease in the average distortion D, when the element is changed according to equation (20). According to another example, the element of r that is to be changed is chosen according to some predefined order. According to yet another example, the element of r that is to be changed is chosen randomly.

In step 505, the element of r chosen in step 504 is assigned a new value according to equation (20). Thus, the new value of the specific element of r is locally optimal.

After convergence has been reached, the iterative process ends in step 506, whereafter the rate of the decodable subsets of the streams, that is the controller output, is given by the so obtained reconstruction points.

Even though the present invention has been described with reference to specific exemplifying embodiments thereof, many different alterations, modifications and the like will become apparent for those skilled in the art. The described embodiments are therefore not intended to limit the scope of the present invention, as defined by the appended claims.

Furthermore, any reference signs in the claims should not be construed as limiting the scope of the present invention. Also, in the claims, the indefinite article "a" or "an" does not exclude plurality.

The invention claimed is:

1. A method for controlling an encoder in a communications system including a plurality of receivers, wherein the encoder output consists of a plurality of streams, and wherein a first decodable subset of the plurality of streams is decoded independently of a second decodable subset of the plurality of the streams, the method including the steps of:
   (a) partitioning the plurality of receivers into a plurality of cells, wherein each of the cells is associated with a decodable subset of the streams;
   (b) assigning an initial transmission rate to each decodable subset of the streams based on an estimate of available bandwidth for communicating with receivers in the cell associated with the decodable subset of the streams;
   (c) for a first cell of the plurality of cells, determining an average distortion perceived by the receivers in the first cell and the receivers in cells bordering the first cell given the initial transmission rate assigned to the decodable subset of the streams associated with the first cell;
   (d) determining whether the average distortion exceeds a threshold distortion;
   (e) in response to determining that the average distortion exceeds the threshold distortion, assigning a new transmission rate to the decodable subset of the streams associated with the first cell, wherein the new transmission rate is based on minimizing the average distortion perceived by the receivers in the cells bordering the first cell; and
   (f) controlling the encoder to output the decodable subset of the streams associated with the first cell in accordance with the new transmission rate assigned to the decodable subset of the streams;
   wherein the decodable subsets of the streams have one or more of the following adaptable properties:
   the signal representation length per time unit;
   the error resilience; and
   the erasure resilience.

2. The method according to claim 1, wherein steps (c)-(e) are performed for one or more other cells of the plurality of cells, and step (f) further comprises controlling the encoder to output the decodable subsets of the streams associated with the one or more other cells in accordance with the new transmission rates assigned to the decodable subsets of the streams.

3. The method according to claim 2, wherein the one or more other cells are selected randomly, according to a predefined order, or such that for each of the one or more other cells selected, the average distortion perceived by the receivers contained in cells bordering the cell is decreased the most compared to choosing any other cell of the plurality of cells.

4. The method according to claim 1, wherein the encoder includes one or more of the following:
   a plurality of sub-encoders, each sub-encoder outputting one stream, wherein each sub-encoder is provided with a property of the stream that is outputted by the sub-encoder, and
   a layered or multiple-description encoder outputting a plurality of streams forming a number of decodable subsets, wherein said encoder is provided with a property for each decodable subset that is outputted by said encoder.

5. The method according to claim 1, further comprising receiving feedback information for the plurality of receivers, wherein the feedback information includes a measure of the rate that may be used to transmit signals to a receiver.

6. The method according to claim 1, wherein the plurality of streams includes video or audio signals.

7. An encoder for use in a communications system including a plurality of receivers, wherein the encoder output consists of a plurality of streams, and wherein a first decodable subset of the plurality of streams is decoded independently of a second decodable subset of the plurality of the streams, the encoder including:
   a control unit configured to:
   (a) partition the plurality of receivers into a plurality of cells, wherein each of the cells is associated with a decodable subset of the streams,
   (b) assign an initial transmission rate to each decodable subset of the streams based on an estimate of available bandwidth for communicating with receivers in the cell associated with the decodable subset of the streams;
   (c) for a first cell of the plurality of cells, determine an average distortion perceived by the receivers in the first cell and the receivers in cells bordering the first cell given the initial transmission rate assigned to the decodable subset of the streams associated with the first cell;
   (d) determine whether the average distortion exceeds a threshold distortion;
   (e) in response to determining that the average distortion exceeds the threshold distortion, assign a new transmission rate to the decodable subset of the streams associated with the first cell, wherein the new transmission rate is based on minimizing the average distortion perceived by the receivers in the cells bordering the first cell; and
   (f) control the encoder by outputting the decodable subset of the streams associated with the first cell in accordance with the new transmission rate assigned to the decodable subset of the streams; and
   wherein the decodable subsets of the streams have one or more of the following adaptable properties:
   the signal representation length per time unit;
   the error resilience; and
   the erasure resilience.

8. The encoder according to claim 7, wherein the control unit is further configured to perform (c)-(e) for one or more other cells of the plurality of cells, and control the encoder by outputting the decodable subsets of the streams associated with the one or more other cells in accordance with the new transmission rates assigned to the decodable subsets of the streams.

9. The encoder according to claim 8, wherein the control unit is further configured to select the one or more other cells randomly, according to a predefined order, or such that for each of the one or more other cells selected, the average distortion perceived by the receivers contained in cells bordering the cell is decreased the most compared to choosing any other cell of the plurality of cells.

10. The encoder according to claim 7, further including one or more of the following:

a plurality of sub-encoders, each sub-encoder outputting one stream, wherein each sub-encoder is provided with a property of the stream that is outputted by the sub-encoder, and a layered or multiple-description encoder outputting a plurality of streams forming a number of decodable subsets, wherein said encoder is provided with a property for each decodable subset that is outputted by said encoder.

11. The encoder according to claim 7, wherein the control unit is further adapted to receive feedback information for the plurality of receivers, wherein the feedback information includes a measure of the rate that may be used to transmit signals to a receiver.

12. The encoder according to claim 7, wherein the plurality of streams includes video or audio signals.

13. The method according to claim 2, wherein the encoder includes one or more of the following:

a plurality of sub-encoders, each sub-encoder outputting one stream, wherein each sub-encoder is provided with a property of the stream that is outputted by the sub-encoder, and a layered or multiple-description encoder outputting a plurality of streams forming a number of decodable subsets, wherein said encoder is provided with a property for each decodable subset that is outputted by said encoder.

14. The method according to claim 3, wherein the encoder includes one or more of the following:

a plurality of sub-encoders, each sub-encoder outputting one stream, wherein each sub-encoder is provided with a property of the stream that is outputted by the sub-encoder, and a layered or multiple-description encoder outputting a plurality of streams forming a number of decodable subsets, wherein said encoder is provided with a property for each decodable subset that is outputted by said encoder.

15. The method according to claim 5, further comprising obtaining estimates of transmission quality measures of the decodable subsets of the streams by modeling the measure of the rate that may be used to transmit signals to the receiver.

16. The method according to claim 15, further comprising controlling the encoder to output the decodable subsets of the streams in accordance with the obtained estimates of transmission quality measures of the decodable subsets of the streams.

17. The method according to claim 15, wherein the measure of the rate that may be used to transmit signals to the receiver is modeled using a continuous stochastic variable while minimizing the distortion perceived by the receiver.

18. The encoder according to claim 7, wherein the control unit is further configured to obtain estimates of transmission quality measures of the decodable subsets of the streams by modeling the measure of the rate that may be used to transmit signals to the receiver.

19. The encoder according to claim 18, wherein the control unit is further configured to control the encoder by outputting the decodable subsets of the streams in accordance with the obtained estimates of transmission quality measures of the decodable subsets of the streams.

20. The encoder according to claim 18, wherein the control unit is further configured to model the measure of the rate using a continuous stochastic variable while minimizing the distortion perceived by the receiver.

* * * * *